United States Patent [19]

Lawson et al.

[11] 3,810,143
[45] May 7, 1974

[54] TEMPERATURE COMPENSATED FLUID SENSOR

[75] Inventors: James O. Lawson; David F. Thompson, both of Warren, Pa.

[73] Assignee: GTE Sylvania Incorporated, Seneca Falls, N.Y.

[22] Filed: Apr. 9, 1973

[21] Appl. No.: 349,290

[52] U.S. Cl. ............................. 340/244 R, 337/377
[51] Int. Cl. ........................................... G08b 21/00
[58] Field of Search ................ 340/244 R; 337/377

[56] References Cited
UNITED STATES PATENTS

| | | | |
|---|---|---|---|
| 2,993,976 | 7/1961 | Moore | 337/377 |
| 3,600,946 | 8/1971 | Ziemba | 340/244 R |

*Primary Examiner*—Thomas B. Habecker
*Attorney, Agent, or Firm*—Norman J. O'Malley; Donald R. Castle; William H. McNeill

[57] ABSTRACT

There is described an improved apparatus for detecting the presence or absence of fluid. The apparatus comprises an electrical circuit and a sensor device electrically joined to the circuit. The device comprises a housing member defining a chamber, a thermally conductive member within the chamber, a tip member forming a closure for the chamber, an element within said chamber having first and second spaced apart portions, means for heating this element comprising an electrical resistive element, and first and second heat responsive members respectively affixed to the spaced apart portions and adapted for engaging when the temperature difference between these portions exceeds a predetermined level. The improvement comprises providing a portion of electrically insulative material intermediate and engaging the spaced apart portions whereby the first spaced apart portion is electrically insulated from the electrical resistive element and the second spaced apart portion is electrically connected to the electrical resistive element.

16 Claims, 6 Drawing Figures

PATENTED MAY 7 1974

TEMPERATURE COMPENSATED FLUID SENSOR

CROSS REFERENCE TO CO-PENDING APPLICATIONS

A previous patent application U.S. Ser. No. 236,148, filed Mar. 20, 1972 discloses and claims a sensing apparatus and device and is assigned to the same assignee of the present invention. The present application comprises an improvement to this apparatus and device.

BACKGROUND OF THE INVENTION

This invention relates to fluid sensing apparatus and more particularly to an apparatus for providing an indication when said fluid approaches a predetermined level.

Previous known methods for detecting fluid have varied from mechanically operated floats to probing devices requiring elaborate electronic circuitry. A particular shortcoming to many devices of the former variety has been the inability to compensate for a change in temperature of the fluid being measured. Additionally, those devices able to compensate for fluid temperature changes have, as mentioned, required extensive electronic circuitry which in turn has added appreciably to the complexity of operation of the device as well as to the cost for manufacturing such items.

It is believed, therefore, that a device for detecting the presence or absence of fluid at a predetermined level within a container which would compensate for varying temperatures of the fluid being measured as well as be relatively simple in operation and inexpensive to manufacture would constitute an advancement in the art.

OBJECTS AND SUMMARY OF THE INVENTION

It is therefore a primary object of this invention to provide a fluid sensing apparatus which includes a means for compensating for possible varying temperatures of the fluid to be detected.

It is a further object of this invention to provide a sensing apparatus which operates in a relatively simple manner and is relatively inexpensive to manufacture.

It is a still further object of this invention to provide a fluid sensing apparatus which provides a continuously steady indication when said fluid is at a predetermined level.

In accordance with one aspect of this invention, there is provided an improved apparatus for detecting the presence or absence of fluid at a predetermined level within a container. This apparatus comprises an electrical circuit having a potential source and a current indicating means for indicating when the current in the circuit exceeds an established level. Additionally, the apparatus comprises a sensor device electrically connected to the circuit and having a housing, a thermally conducting member positioned within the housing and insulated therefrom, a tip member bonded to the housing, an element having first and second opposing ends of conductive material, means for heating this element comprising an electrical resistive element and first and second oppositely aligned bimetallic members possessing a substantially similar degree of thermal deflection and affixed respectively to the first and second opposing ends of the element. These bimetallic members are adapted for engaging only when the temperature difference between the opposing ends of the element exceeds a predetermined level. The improvement to this apparatus comprises providing a portion of electrically insulative material intermediate and engaging the spaced apart portions whereby the first spaced apart portion is electrically insulated from the resistive element and the second spaced apart portion is electrically connected to the resistive element. This provision assures a continuous engagement between the bimetallic members as long as the previously described temperature difference exists.

DETAILED DESCRIPTION OF THE PREFERRED EMBODIMENTS

For a better understanding of the present invention, together with other and further objects, advantages and capabilities thereof, reference is made to the following disclosure and appended claims in connection with the aforedescribed drawings.

Figure 1:
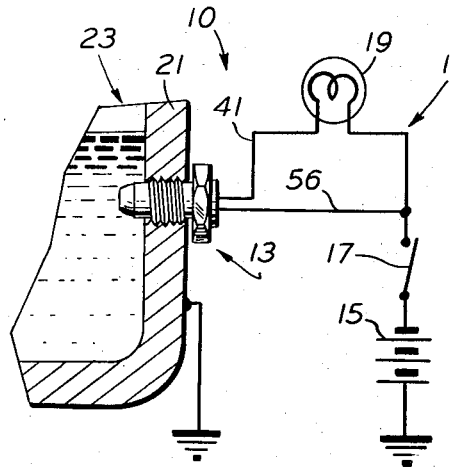
FIG. 1 is a side elevational view of one embodiment of the present invention.

In FIG. 1, one embodiment of a fluid detecting apparatus 10 in accordance with the invention is illustrated and shown to comprise an electrical circuit 11 and a sensor device 13. Circuit 11 comprises a potential source illustrated as battery 15 and a current indicating means, illustrated as bulb 19. An optional switching means 17 is also provided for opening and closing circuit 11. Sensor device 13 is electronically connected to circuit 11 and is shown to be positioned within wall 21 of a fluid holding container 23. Although the particular method illustrated for positioning sensor 13 is to place it in the side of container 23, sensor 13 may be placed in either the bottom or top of the container depending on the level of fluid desired or the configuration of the container. Furthermore, although the method shown for retaining sensor 13 in wall 21 is by screw threads (the sensor being provided with external screw threads to mate with corresponding threads in wall 21), other methods for retention are possible, an example being either welding or soldering. The method illustrated is preferred, however, because it provides relative ease of removal of sensor 13 in the event of damage to the sensor or container. As described, switch 17 is an optional component to circuit 11 and is included in the present invention as a means for electrically isolating sensor 13 and bulb 19 from battery 15, thereby eliminating drain on the battery when operation of the sensor device is not desired.

Figure 2:
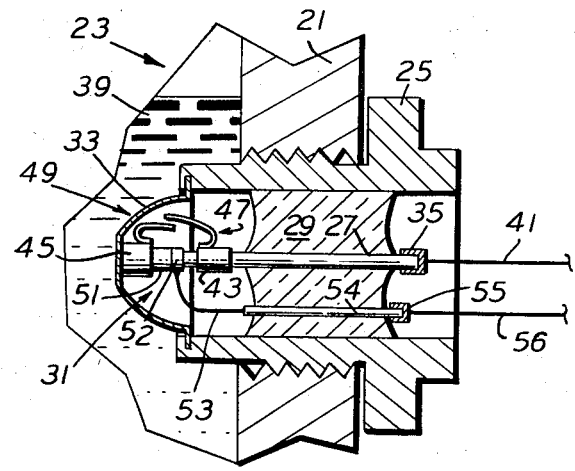
FIG. 2 is an enlarged view of the sensor device of FIG. 1.

In FIG. 2 can be seen a more detailed view of sensor 13, which is shown to comprise a housing 25 of electrically conductive material, a thermally conducting member, illustrated as center post 27, which is positioned within housing 25 and electrically insulated therefrom by insulating material 29, element 31, and a tip member 33 of electrically conductive material. Center post 27 is preferably also electrically conductive and is connected to circuit 11 via plug 35 which in turn is connected to conducting wire 41. Plug 35 is but one means possible for providing this interconnection and is not meant as the sole method to which the invention is limited. Additional connecting means, including an alligator clip or even a single wire soldered to post 27 are possible. In the event that the atmosphere surrounding container 23 is not favorable for exposed electrical connections, a plug having an insulating cap to encompass the external portions of either post 27 or housing 25 is preferred.

Tip member 33, sealed in housing 25 to thereby encapsulate element 31 therein, is adapted for being subjected to the fluid 39 within container 23. A preferred material for tip member 33 is sold under the trade name "Rodar" and manufactured by the W. B. Driver Company of Newark, New Jersey, a subsidiary of the assignee of the present invention. "Rodar", consisting essentially of about 29 percent by weight nickel, 17 percent by weight cobalt, and the remainder iron, is a suitable electrical conductor and possesses the additional property of relatively low thermal conductivity. This additional property, as will be further explained, is highly desirable to enhance the functioning characteristics of sensor 13. Element 31, comprising first and second opposing ends 43 and 45 respectively, is joined at first opposing end 43 to center post 27 and at second opposing end 45 to tip member 33. First and second opposing ends 43 and 45 are of electrically conductive material and have first and second heat responsive members 47 and 49 affixed respectively thereto. The conductive material preferred for opposing ends 43 and 45 is a nickel-silver metallic alloy, although any of the well known metals or metal alloys having good electrical conducting properties can be utilized.

Heat responsive members 47 and 49, illustrated as a pair of bimetallic members, possess similar electrical conducting properties and are illustrated as being oppositely aligned and in a non-engaging relationship when the fluid level in container 23 is above tip member 33.

Figure 5:
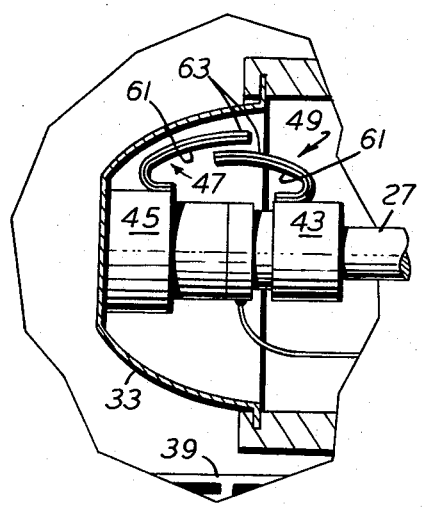
FIGS. 5 and 6 are enlarged views of various phases of operation of an alternative embodiment of the present invention.
Figure 6:
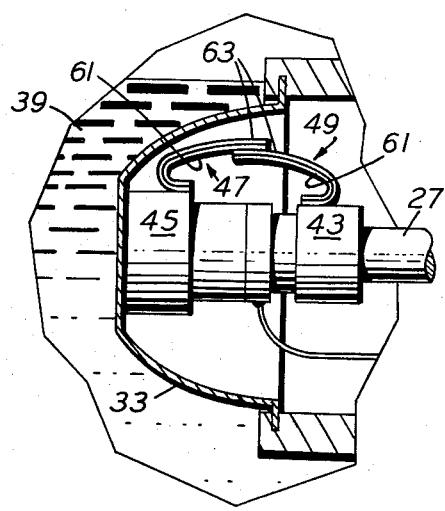

In the embodiment illustrated in FIGS. 3 and 4, these bimetallic members are adapted for engaging when the fluid level drops below tip member 33. In the embodiment of FIGS. 5 and 6, these members engage when the fluid level rises above the level of the tip member in container 23.

A means for heating element 31, illustrated as a resistive element 51, is shown in FIG. 2 and has a portion of electrically conductive material 52 positioned immediately adjacent thereto in an electrically connecting relationship. A suitable resistive material for element 51 is a substantially thin layer of tin oxide although practically any material having suitable electrical resistive properties would suffice. A material preferred for electrically conductive material 52 is silver or one of the similarly known metals having good electrical conducting properties.

As illustrated, conductive material 52 is electrically connected to resistive element 51 and to a connecting wire 53 which in turn is electrically joined to second post 54. Post 54, of a good electrical conductive material such as copper, is positioned within insulating material 29 in a manner substantially similar to that for center post 27. Accordingly, a plug 55 is affixed to the protruding end of second post 54 and a wire 56 electrically joined thereto. The previously described conductive material 52 — plug 55 assembly provides a means whereby first spaced apart portion 43 is electrically insulated from resistive material 51, the purpose of which will be explained with the description of FIGS. 3 and 4.

Figure 3:
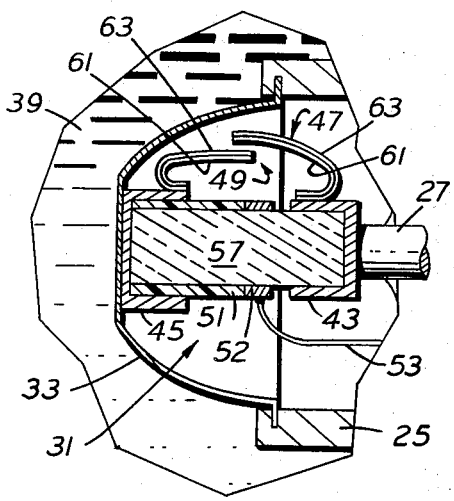
FIGS. 3 and 4 are enlarged views of various phases of operation of the sensor of FIG. 2.
Figure 4:
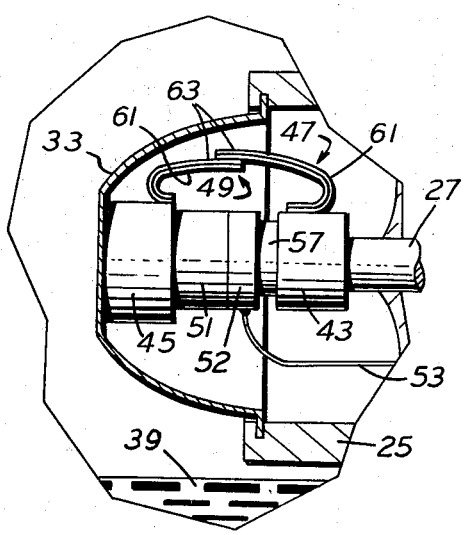

To explain the operation of apparatus 10, particular reference is made to FIGS. 3 and 4. In FIG. 3, tip member 33 is shown to be subjected to fluid 39 within container 23. As previously explained, bimetallic members 47 and 49 are in a non-engaging relationship when these members are at the same temperature. These members are comprised of a suitable bimetal having similar electrical conductive properties as well as similar degrees of thermal deflection thereby permitting each member to deflect at a substantially equal rate, as the environmental temperature alters. A unique feature of sensor device 13 is its ability to operate in fluids having a wide variety of temperatures, due to the positioning of bimetallic members 47 and 49. When the fluid surrounding tip member 33 is excessively warm, expandable members 47 and 49 deflect equally to remain non-engaged. In the event that the fluid is cooled, these members deflect accordingly in the opposite direction. It is remembered, however, that members 47 and 49 maintain a non-engaging relationship throughout these varying states of deflection, provided tip member 33 is subjected to the fluid within the container thereby keeping the temperature of all elements within the sensor substantially equal.

To operate apparatus 10, switching means 17 is closed, thereby providing electrical current to circuit 11 and to sensor 13. A typical direction of current flow from battery 15 when the bimetallic members are not engaged is through second post 54, connecting wire 53, conductive material 52, resistive material 51, second spaced apart portion 45, tip member 33, housing 25, and to ground. It can readily be seen that in the event it is preferred to have a container of a material other than electrically conductive, it would only be necessary to ground housing 25 in order for apparatus 10 to function.

First spaced apart portion 43, electrically joined to center post 27 and bulb 19, is electrically insulated from resistive material 51. This is achieved by providing a portion of electrically insulative material 57, preferably glass, intermediate and engaging both spaced apart portions 43 and 45 in the manner as indicated in FIG. 3. Electrical current in the previously described circuit thereby by-passes first spaced apart portion 43. The electrical current through resistive material 51 causes this material to become warm as is the case in almost all electrical resistors. The heat which is thus generated provides a means for heating spaced apart portions 43 and 45 of element 31. This is achieved with regard to portion 45 by a directly contacting relationship, as shown. However, regarding portion 43, some of the heat generated by resistive material 51 must pass through the electrically insulative material 57. As described, the material is preferably glass which provides the required properties of being both an electrically insulative and thermally conductive material. The heat generated by resistive material 51 thereby dissipates out through opposing portions 43 and 45 of element 31. The heat dissipated through portion 43 is heat sinked further through center post 27, insulative material 29, housing 25, and eventually into container wall 21. The heat dissipated through portion 45 is heat sinked primarily through tip member 33 and then into the fluid within container 23. Provided tip member 33 remains subjected to the fluid, the heat generated by resistive material 51 is dissipated at a substantially equal rate through the above-described channels thereby maintaining the temperature of all members within sensor 13 approximately the same. However, when the fluid level drops below tip member 33, as illustrated in FIG. 4, an imbalance to this rate of dissipation is created. This unequal rate occurs primarily because the fluid, which previously served as a heat sink for the heat generated in end 45, is now absent. However, to further assure this imbalance during a low fluid level, it is preferred that the overall volume of center post 27 be substantially greater than the corresponding volume of tip member 33. It is also additionally preferred that the coefficient of thermal conductivity of center post 27 be larger than that of tip member 33, but this is not necessarily required provided a substantial difference of volumes between these two members exists. In the particular embodiment, the tip member comprised of Rodar has a coefficient of thermal conductivity of approximately 12.0 BTU/(hr.) (sq. ft.) (°F per ft.) while that of center post 27 which is preferably of steel or similar composition, ranges between 25 and 40 BTU/(hr.) (sq. ft.) (°F per ft.).

As described, the absence of fluid now causes portion 45 to become substantially warmer than portion 43. This temperature difference in turn causes bimetallic member 49 to become warmer than bimetallic member 47 which results in an unequal amount of deflection by bimetallic member 49 to therefore upwardly deflect and engage member 47. When these two members engage (as shown in FIG. 4), electrical current passes from center post 27 through first opposing end 43 and directly to second opposing end 45 via the engaged bimetallic members 47 and 49. This new path of current flow provides a means whereby bulb 19 is actuated, indicating to an operator that the fluid level in container 23 is below tip member 33. Because a parallel relationship exists, current will also continue to flow through resistive material 51 thereby providing a continuousous supply of heat and therefore continuous engagement between the bimetallic members. Thus, a steady indication is achieved and comprises the main purpose of the present invention. Assuring that bulb 19 will light properly under the conditions described is easily accomplished by proper selection of corresponding elements in the sensor and circuit. One example of a workable circuit-sensor arrangement is to use a 12 volt battery connected to a bulb having a resistance of approximately 1 ohm. When using this combination, the desired resistance of the resistive material of element 31 is approximately 240 ohms. The resistance of other elements in sensor 13, particularly housing 25, opposing portions 43 and 45, center post 27, second post 54, conductive material 52, tip member 33, and bimetallic members 47 and 49 is minimal and can be considered effectively as zero.

Another embodiment of the present invention is illustrated in FIGS. 5 and 6 wherein it is shown that the bimetallic members 47 and 49 described in FIGS. 3 and 4 have been reversed from their previous positioned relationship. More specifically, bimetallic member 47 is affixed to second spaced apart portion 45 and bimetallic member 49 is affixed to first spaced apart portion 43. All other compartments of sensor 13, as described in FIGS. 3 and 4, are substantially the same. During fabrication of the sensor of FIGS. 5 and 6, the bimetallic members are prepositioned in an engaged relationship. Thus, when power is applied in the absence of fluid 39 about tip 33, bimetallic member 47 will upwardly deflect and disengage member 49. Bimetallic member 49 will remain in substantially the same position as indicated in FIG. 5 because first spaced apart portion 43 is still provided with a heat sinking capability through center post 27. When tip member 33 is subjected to fluid 39, as shown in FIG. 6, bimetallic member 47 will downwardly deflect and engage member 49. Accordingly, bulb 19 will be lit and an indication of fluid about tip 33 is provided.

To adequately achieve the degree of deflection required in the operation of the sensors illustrated, similar bimetals must be used for each of members 47 and 49. More specifically, a bimetal utilized successfully in sensor 13 is Chace 2400 bimetal, manufactured by the W. M. Chace Company of Detroit, Michigan, a subsidiary of the previously mentioned W. B. Driver Company. Chace 2400 bimetal has a high expanding side (illustrated as high expanding layer 61 in FIGS. 3-6) consisting essentially of about 22 percent by weight nickel, 3 percent by weight chromium, with the remainder iron, and a low expanding side (illustrated as low expanding layer 63 in FIGS. 3-6) consisting essentially of 36 to 42 percent nickel with the remainder iron. An additional newly available bimetal also found suitable for use in sensor 13 is one produced by the W. M. Chace Company having a high expanding side consisting essentially of 22 percent nickel, 3 percent chromium, with the balance iron, and a low expanding side consisting essentially of 30 to 35 percent nickel with the remainder iron. The high expanding side of the bimetal has a first coefficient of thermal expansion of from 0°F to 150°F of at least $7.0 \times 10^{-6}$ per °F and a second coeffcient of thermal expansion lower than the first over a temperature range from 150°F to 600°F. The low expanding side of the bimetal has a first coefficient of expansion ranging from about $1.4 \times 10^{-6}$ per °F to about $6.0 \times 10^{-6}$ per °F over a temperature range of 0°F to 150°F and a second coefficient of expansion of at least $7.0 \times 10^{-6}$ per °F over a temperature range from about 400°F to 600°F. This particular bimetal reduces many of the stresses found in prior art bimetals and results in improved overall operating conditions, especially in the higher temperature ranges. Depending on the configuration used for each of the bimetallic members, as well as the initial spacing between these members and the temperature difference required to cause their engaging, other bimetallic materials can be utilized successfully in this invention. For practical reasons, however, bimetallic materials having operating characteristics substantially similar to those described are preferred.

In addition to providing means whereby a visual indication is given when the fluid within container 23 is below or above a certain level (in FIG. 1), apparatus 10 can be modified to perform other functions by relatively simple alterations to circuit 11, such as energizing other circuits, or to operate other mechanisms such as audible signals, valving arrangements and the like. For example, circuit 11 can be modified to include a means for actuating a valving arrangement in a boiler to thereby either shut down a burner or to open a valve and permit more fluid to enter the container, depending on the pre-established fluid level setting.

Besides this particular application, apparatus 10 may also be used in other situations in which the fluids to be detected vary in temperature throughout their cycles of operation. Primary examples of such situations are found in the several containers of fluids utilized in the operation of automobiles. Sensor device 13 could easily be inserted into an automobile's brake fluid housing, radiator side wall, or the various housings for the transmission fluid, engine oil, power steering fluid, differential fluid, or even the windshield washer fluid, with the automobile's electrical circuitry readily able to substitute for circuit 11.

Thus, there has been provided an apparatus for detecting the presence or absence of fluid at a predetermined level within a container. Unique features of this apparatus, which include temperature compensation means for varying fluid temperatures and continuously actuated current indicating means, have also been provided.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a sensor device comprising a housing member defining a chamber, a thermally conductive member within said chamber, a tip member secured to said housing and forming a closure for said chamber, an element within said chamber having first and second spaced apart portions, said first portion being joined in heat conductive relationship to said thermally conductive member, said second portion being secured in thermally conductive relationship to a surface of the tip member within said chamber, means for heating said element comprising an electrical resistive element, and first and second heat responsive members secured to said first and second spaced apart portions, respectively, said heat responsive members each having a free end adapted for engaging only when the temperature difference between said first and second portions of said element exceeds a predetermined level, the improvement comprising:
providing a portion of electrically insulative material intermediate and engaging said first and second spaced apart portions whereby said first spaced apart portion is electrically insulated from said electrical resistive element and said second spaced apart portion is electrically connected to said electrical resistive element.

2. The improvement according to claim 1 wherein said portion of electrically insulative material intermediate and engaging said first and second spaced apart portions is glass.

3. The improvement according to claim 1 wherein said thermally conductive member and said tip member are electrically conductive.

4. The improvement according to claim 1 wherein said heat responsive members are bimetallic members.

5. In a sensing apparatus comprising a sensor device comprising a housing member defining a chamber, a thermally conductive member within said chamber, a tip member secured to said housing and forming a closure for said chamber, an element within said chamber having first and second spaced apart portions, said first portion being joined in heat conductive relationship to said thermally conductive member, said second portion being secured in thermally conductive relationship to a surface of the tip member within said chamber, means for heating said element comprising an electrical resistive element, first and second heat responsive members secured to said first and second spaced apart portions, respectively, said heat responsive members each having a free end adapted for engaging only when the temperature difference between said first and second portions of said element exceeds a predetermined level, and means for sensing when said heat responsive members are engaged, the improvement comprising:
providing a portion of electrically insulative material intermediate and engaging said first and second spaced apart portions whereby said first spaced apart portion is electrically insulated from said electrical resistive element and said second spaced apart portion is electrically connected to said electrical resistive element.

6. The improvement according to claim 5 wherein said portion of electrically insulative material intermediate and engaging said first and second spaced apart portions is glass.

7. The improvement according to claim 5 wherein said means for sensing when said heat responsive members are engaged is an electrical circuit comprising a source of electrical potential operatively connected to said heat responsive members for opening and closing said circuit and a current indicating means adapted for indicating electrical current in said circuit when said heat responsive members are engaged.

8. The improvement according to claim 5 wherein said heat responsive members are bimetallic members.

9. The improvement according to claim 7 wherein said electrical resistive element within said chamber is operatively connected to said source of electrical potential.

10. The improvement according to claim 7 wherein said thermally conductive member is electrically conductive and is operatively connected to said source of electrical potential and said tip member is electrically conductive and is operatively connected to said source of electrical potential and said electrical resistive element.

11. In the combination comprising a container having walls adapted for containing a fluid therein, a sensor device at least partially positioned within a wall of said container, said device comprising a housing member defining a chamber, a thermally conductive member within said chamber, a tip member secured to said housing and forming a closure for said chamber, an element within said chamber having first and second spaced apart portions, said first portion being joined in heat conductive relationship to said thermally conductive member and said second portion being secured in thermally conductive relationship to a surface of the tip member within said chamber, means for heating said element comprising an electrical resistive element, first and second heat responsive members secured to said first and second spaced apart portions, respectively, said heat responsive members each having a free end adapted for engaging only when the temperature difference between said first and second portions of said element exceeds a predetermined level, and means for sensing when said heat responsive members are engaged, the improvement comprising:

providing a portion of electrically insulative material intermediate and engaging said first and second spaced apart portions whereby said first spaced apart portion is electrically insulated from said electrical resistive element and said second spaced apart portion is electrically connected to said electrical resistive element.

12. The improvement according to claim 11 wherein said means for sensing when said heat responsive members are engaged is an electrical circuit comprising a source of electrical potential operatively connected to said heat responsive members for opening and closing said circuit and a current indicating means adapted for indicating electrical current in said circuit when said heat responsive members are engaged.

13. The improvement according to claim 11 wherein said portion of electrically insulative material intermediate and engaging said first and second spaced apart portions is glass.

14. The improvement according to claim 11 wherein said heat responsive members are bimetallic members.

15. The improvement according to claim 12 wherein said electrical resistive element within said chamber is operatively connected to said source of electrical potential.

16. The improvement according to claim 12 wherein said thermally conductive member is electrically conductive and is operatively connected to said source of electrical potential and said tip member is electrically conductive and is operatively connected to said source of electrical potential and said electrical resistive element.

* * * * *